Patented May 26, 1953

2,640,078

UNITED STATES PATENT OFFICE 2,640,078

PREPARATION OF AMIDES

Harry A. Straw, Wilmington, Del., assignor to E. I. du Pont de Nemours and Company, Wilmington, Del., a corporation of Delaware No Drawing. Application March 9, 1951,
Serial No. 214,857

14 Claims. (Cl. 260—561)

This invention relates to the preparation of alkanoic acid amides; more particularly, it relates to a process for the preparation of amides from organic sulfides.

It has recently been reported in USP 2,495,567 to Carmack et al., that amides are obtainable by reaction between olefinic compounds and aqueous ammonium polysulfide. The reaction involved is similar to the reaction discovered by Willgerodt in 1887 at which time Willgerodt disclosed the reaction between aryl alkyl ketones and ammonium polysulfide to form nitrogeneous materials.

Copending application U. S. Serial No. 185,907, filed September 20, 1950 in the name of M. A. Naylor, Jr., now abandoned, describes and claims a process of reacting an alkene with ammonium polysulfide to produce an alkanoic acid amide and an alkene-sulfur oil, separating the amide from the alkene-sulfur oil, and thereafter reacting the oil with aqueous ammonium polysulfide to form additional alkanoic acid amide. Generally, in the reaction of an alkene with aqueous ammonium polysulfide, the formation of oils occurs at temperatures below 260° C. The oils generally contain dialkyl sulfides, the sulfur content of which depends to some extent upon the amount of free and combined sulfur initially present in the reaction mixture. Dialkyl monosulfide, dialkyldisulfide, and higher sulfides of the dialkylpolysulfide type are thus obtainable, and are included in the oil mixtures. All of these oils are convertible to amides by reaction with aqueous ammonium polysulfide. The present invention, however, is directed to preparing alkanoic acid amides from organic sulfides without further addition of free or combined sulfur.

An object of this invention is to provide a process for obtaining amides from organic sulfides, especially those of the formula $(C_nH_{2n+1})_2S_x$ wherein $x$ has a value of at least 3. A still further object is to convert alkene-sulfur oils to amides without the use of additional sulfur. Other objects of the invention will appear hereinafter.

The aforesaid objects are accomplished in accordance with this invention by heating an alkene-sulfur oil containing at least sufficient sulfur to have an average composition $(C_nH_{2n+1})_2S_3$, with water and a nitrogen-containing compound from the group consisting of ammonia, aliphatic primary amines and aliphatic secondary amines, at a temperature between 175° C. and 350° C., whereby the alkene-sulfur oil is converted to an alkanoic acid amide, and thereafter separating the alkanoic acid amide from the resulting mixture. If water is omitted corresponding thioamides are formed.

In more specific form the reaction is carried out by heating an alkene-sulfur oil having an average composition between $(C_nH_{2n+1})_2S_3$ and $(C_nH_{2n+1})_2S_8$, with ammonia and water at a temperature between 240° C. and 270° C. The value of $n$ may vary quite widely since the size of the alkyl groups is not critical.

The alkene-sulfur oils employed in the present invention may be prepared by several methods. An alkene may be reacted with sulfur in an aqueous or anhydrous medium at a temperature between 160° C. and 250° C., preferably between 190° C. and 210° C. This reaction is facilitated by adding hydrogen sulfide to the initial reactants. Alternatively, an alkene-sulfur oil may be prepared by reacting an alkene with sulfur dioxide and hydrogen sulfide in the presence of a catalytic amount of a compound from the group consisting of aliphatic tertiary amines, cobalt, nickel, zinc and manganese sulfides. This reaction is also carried out at a temperature between 160° C. and 250° C., preferably between 190° C. and 210° C.

In preparing the alkene-sulfur oil any aliphatic alkene may be employed in the aforesaid process, but particularly advantageous results are obtained when the alkene is propylene or isobutylene; the amides produced from these specific olefins are propionamide and isobutyramide, respectively. Other suitable alkenes include ethylene, n-butenes, pentenes, hexenes, 3,5,5-trimethylhexenes, dodecenes, octadecenes and the like.

The present invention resides in the discovery that the alkene-sulfur oils employed may be converted to an alkanoic acid amide by reaction with a nitrogen compound from the group consisting of ammonia, aliphatic primary amines and aliphatic secondary amines without further addition of free or combined sulfur. Hence, by completely converting an alkene to an alkene-sulfur oil, i. e., a polysulfide oil, and thereafter converting the oil to amide in accordance with the present invention, exceptionally high conversion of alkene to the corresponding alkanoic acid amide is obtained.

The following examples, in which all parts are by weight unless otherwise specified, illustrate the present invention.

*Example 1.*—The following ingredients were introduced into a stainless steel cylindrical pressure tube:

| | Parts |
|---|---|
| Water (3.0 mols) | 54 |
| Hydrogen sulfide (2.07 mols) | 73.5 |
| Sulfur dioxide (0.83 mol) | 53 |
| Trimethylamine (0.1 mol) | 5.9 |
| Propylene (1 mol) | 42 |

The tube was shaken mechanically while heated to a temperature of 195–205° C. for 15 minutes, and then cooled to room temperature. The gaseous products were released and the residual two-phase red-brown liquid was filtered, removing 21.3 parts of suspended solids which was largely sulfur. The propylene-sulfur oil, which separated from the water solution, was obtained as a dark red liquid consisting of about 114 parts, $n_D^{26}=1.6318$. The propylene-sulfur oil contained 66.9% sulfur, 28.9% carbon and 5.55% hydrogen, corresponding to an average composition of $(C_{3.0}H_{7.0})_2S_{5.2}$, was obtained in 90.1% conversion from propylene.

The approximate composition of the propylene-sulfur oil determined by distillation was as follows:

| | Per cent |
|---|---|
| n- and isopropyl mercaptans | 0.5 |
| n- and isopropyl sulfides | 4.7 |
| n- and isopropyl disulfides | 0.3 |
| n- and isopropyl trisulfides | 43.8 |
| Viscous brown liquid material (not volatile at 150° C. at 1 mm. pressure) | Remainder |

The following materials were introduced into a stainless steel cylindrical pressure tube:

| | Parts |
|---|---|
| Propylene-sulfur oil (0.356 mol) (containing 66.9% sulfur) | 90 |
| Water (2.94 mols) | 53 |
| Ammonia (2.94 mols) | 50 |

The tube was shaken mechanically and heated to 245–255° C. for 15 minutes, and was then cooled to room temperature. Gaseous products (largely hydrogen sulfide) were discharged. The liquid product, consisting of approximately 223 parts, contained about 1.2 parts of a brown oil. The remainder, an aqueous solution, was distilled under diminished pressure giving 34.2 parts of propionamide. The yield of amide was 59% based on the weight of propylene introduced in preparing the propylene-sulfur oil, and the yield, based on the amount of propylene-sulfur oil employed, was 66%.

*Example 2.*—In the same manner as in Example 1, a propylene-sulfur oil containing 67.7% sulfur and corresponding to an average composition of $(C_3H_7)_2S_{5.7}$ was prepared in 75% yield, based upon the weight of propylene, by heating a mixture of the following ingredients for one hour at 170–185° C.:

| | Parts |
|---|---|
| Water (2.5 mols) | 45 |
| Sulfur (2.5 mols) | 80 |
| Hydrogen sulfide (0.5 mol) | 17 |
| Trimethylamine (0.05 mol) | 3 |
| Propylene (0.5 mol) | 21 |

In a similar manner to that employed in Example 1, the propylene-sulfur oil having an average composition of $(C_3H_7)_2S_{5.7}$, obtained from the above reaction, was converted to propionamide (46% yield based on the weight of propylene) by heating at 240–250° C. for 30 minutes a mixture of 45.4 parts (0.169 mol) of the propylene-sulfur oil, 20 parts (1.11 mols) of water, and 12 parts (0.071 mol) of ammonia.

*Example 3.*—In a manner similar to Example 1, a propylene-sulfur oil containing 63.5% sulfur and corresponding to an average composition of $(C_3H_7)_2S_{4.7}$ was prepared in 69.5% yield, based upon the weight of propylene, by heating a mixture of the following ingredients at 195–202° C. for 30 minutes.

| | |
|---|---|
| Cobalt sulfide | 7.5 parts } mixed to form a slurry |
| Water | 36.5 parts |
| Water (2.25 mols) | 40.5 parts |
| Hydrogen sulfide (1.38 mols) | 47 parts |
| Sulfur dioxide (0.50 mol) | 32 parts |
| Propylene (0.75 mol) | 31.5 parts |

The propylene-sulfur oil produced above was converted to propionamide (11.9% yield, based on the weight of propylene) by heating a mixture of 47.6 parts (0.202 mol) of the propylene-sulfur oil, 19 parts (1.06 mols) of water, and 9 parts (0.53 mol) of ammonia at 250–275° C. for 15 minutes.

*Example 4.*—In a manner similar to Example 1, the following ingredients were heated at 205–225° C. for 15 minutes to produce a propylene-sulfur oil containing 66.4% sulfur in 88.1% yield, based upon the weight of propylene:

| | Parts |
|---|---|
| Water (3.0 mols) | 54 |
| Sulfur (2.25 mols) | 72 |
| Hydrogen sulfide (0.50 mol) | 17 |
| Propylene (1.0 mol) | 42 |

The resulting propylene-sulfur oil was converted to propionamide (75.2% yield based on the weight of propylene) by heating at 258–270° C. for 15 minutes a mixture of 86.4 parts (0.338 mol) of the propylene-sulfur oil, 18 parts (1.0 mol) of water and 28 parts (1.65 mols) of ammonia.

*Example 5.*—In the same manner as in Example 1, a propylene-sulfur oil was prepared, but the reaction was carried out in the absence of water. The following ingredients were heated at a temperature of 168–180° C. for one hour:

| | Parts |
|---|---|
| Trimethylamine (0.10 mol) | 5.9 |
| Sulfur dioxide (0.67 mol) | 42.7 |
| Hydrogen sulfide (1.83 mols) | 62.4 |
| Propylene (1.0 mol) | 42 |

The resulting propylene-sulfur oil contained 64.3% sulfur, and was formed in 89.5% yield, based on the weight of propylene.

Propionamide was prepared in 45.6% yield, based upon the weight of propylene, from the above propylene-sulfur oil by heating a mixture of 45.4 parts (0.17 mol) of the propylene-sulfur oil, 11.9 parts (1.125 mols) of ammonia, and 20.3 parts (0.70 mol) of water to 240–250° C. for 30 minutes.

*Example 6.*—In a manner similar to Example 1, a propylene-sulfur oil containing 64.7% sulfur and corresponding to an average composition of $(C_3H_7)_2S_{5.0}$ was isolated in an 88.0% yield, based upon the weight of propylene, by heating at 190–210° C. for 15 minutes a mixture of the following:

| | Parts |
|---|---|
| Sulfur (2.25 mols) | 72 |
| Hydrogen sulfide (0.50 mol) | 17 |
| Propylene (1.0 mol) | 42 |

Propionamide was prepared in about 50% yield, based upon the weight of propylene, from the above propylene-sulfur oil by heating a mixture of 45.4 parts (0.17 mol) of the propylene-sulfur oil, 11.9 parts (1.13 mol) of ammonia, and 20.3 parts (0.70 mol) of water to 240–250° C. for 30 minutes.

*Example 7.*—In a manner similar to Example 1, an ethylene-sulfur oil containing 65.3% sulfur and corresponding to an average composition of $(C_2H_5)_2S_{3.4}$ was prepared in 96.9% yield, based upon the weight of ethylene, by heating a mixture of the following ingredients at 196–200° C. for 18 minutes:

| | Parts |
|---|---|
| Ethylene (1.0 mol) | 28 |
| Trimethylamine (0.1 mol) | 6 |
| Sulfur dioxide (0.83 mol) | 53 |
| Hydrogen sulfide (2.17 mols) | 74 |
| Water (3.0 mols) | 54 |

The resulting ethylene-sulfur oil was converted to acetamide (34% yield, based upon the weight of ethylene) by heating a mixture of 33 parts (0.211 mol) of the ethylene-sulfur oil, 16 parts (0.94 mol) of ammonia and 17 parts (0.95 mol) of water at 260–263° C. for 15 minutes.

*Example 8.*—In the same manner as in Example 1, an isobutylene-sulfur oil containing 60.2% sulfur and corresponding to an average composition of $(C_4H_9)_2S_{5.4}$ was prepared in 60.2% yield, based upon the weight of isobutylene, by heating a mixture of the following ingredients at 195–200° C. for 18 minutes:

| | Parts |
|---|---|
| Isobutylene (1.0 mol) | 56 |
| Trimethylamine (0.1 mol) | 6 |
| Sulfur dioxide (0.83 mol) | 53 |
| Hydrogen sulfide (2.17 mols) | 74 |
| Water (3.0 mols) | 54 |

The resulting isobutylene-sulfur oil was converted to isobutyramide (18.5%, based upon the weight of isobutylene) by heating a mixture of 73.3 parts (0.255 mol) of the isobutylene-sulfur oil, 27 parts (1.6 mols) of ammonia, and 29 parts (1.5 mols) of water at 260–263° C. for 15 minutes.

*Example 9.*—In a manner similar to Example 1, a propylene-sulfur oil containing 73.8% sulfur and corresponding to an average composition of $(C_3H_7)_2S_{7.6}$ was prepared in 85.5% yield, based upon the weight of propylene, by heating a mixture of the following ingredients at 200–260° C. for 1 hour:

| | Parts |
|---|---|
| Propylene (0.33 mol) | 13.9 |
| Trimethylamine (0.033 mol) | 2 |
| Sulfur dioxide (0.56 mol) | 35.6 |
| Hydrogen sulfide (1.44 mols) | 49 |
| Water (1.67 mols) | 30 |

The resulting propylene-sulfur oil was converted to propionamide (44.0% yield, based upon the weight of propylene) by heating a mixture of 43.1 parts (0.131 mol) of the propylene-sulfur oil, 8.5 parts (0.5 mol) of ammonia, and 18 parts (1.0 mol) of water at 200–205° C. for 30 minutes.

*Example 10.*—In a manner similar to Example 1, a propylene sulfur oil containing 31.1% sulfur and corresponding to an average composition of $(C_3H_7)_2S_{1.2}$ was prepared in 69% yield, based upon the weight of propylene, by heating a mixture of the following ingredients at 248–253° C. for 1 hour:

| | Parts |
|---|---|
| Propylene (0.50 mol) | 21 |
| Trimethylamine (0.50 mol) | 30 |
| Sulfur dioxide (0.56 mol) | 24 |
| Hydrogen sulfide (0.37 mol) | 46 |
| Water (1.50 mols) | 27 |

The following mixture was reacted at 240–250° C. for 30 minutes:

| | Parts |
|---|---|
| Propylene-sulfur oil (0.15 mol) | 18.6 |
| Water (0.75 mol) | 12.6 |
| Ammonia (3.5 mols) | 60 |

The entire liquid product was completely distilled but no propionamide was recovered.

*Example 11.*—The following materials were introduced into a stainless steel cylindrical pressure tube:

| | Parts |
|---|---|
| Di-n-propyl disulfide (0.50 mol) (commercially prepared) | 75 |
| Water (1.5 mols) | 2 |
| Ammonia (4.5 mols) | 43 |

The tube was shaken mechanically for 30 minutes at a temperature between 257–265° C., and thereafter the tube was cooled to room temperature. The product was a two-phase liquid. The top oil layer, 60 parts, contained 35% S and corresponded to an average composition $(C_3H_7)_2S_{1.5}$. The aqueous layer contained a quantity of propionamide corresponding to between 2 and 3 percent conversion of the di-n-propyl disulfide.

As illustrated in the foregoing examples, the alkene-sulfur oil may be prepared by reacting an aliphatic alkene with sulfur and hydrogen sulfide or with sulfur dioxide and hydrogen sulfide. The reactions may be carried out in a medium consisting of the essential reactants, as illustrated in Examples 5 and 6, or in an aqueous medium or in a suitable solvent such as dioxane, pyridine or benzene under anhydrous conditions. When elemental sulfur is reacted with an alkene, addition of hydrogen sulfide to the reactants facilitates initiation of the reaction, but initial addition of hydrogen sulfide is not necessary. Usually about 1 mol of hydrogen sulfide per 2 mols of alkene is used when elemental sulfur is a reactant; and when sulfur dioxide and hydrogen sulfide are used, about 2 mols of hydrogen sulfide per mol of alkene is employed.

Sufficient sulfur or sulfur dioxide must be reacted with the alkene to produce an alkene-sulfur oil containing sufficient combined sulfur, e. g., polysulfide sulfur, to have at least an average composition $(C_nH_{2n+1})_2S_3$, preferably $$(C_nH_{2n+1})_2S_5$$

The average composition of the alkene-sulfur oil is based upon the sulfur analysis, as illustrated in the examples. Since the alkene is completely converted to oil the amount of carbon and hydrogen present was assumed to be equal to that represented by the alkene charge. A complete analysis was run on the oil produced in Example 1, and this verified the fact that the average composition of the alkene-sulfur oil could be accurately determined from the sulfur analysis.

Example 10 illustrates that no yield of amide is obtained upon reacting an alkene-sulfur oil having an average composition $(C_nH_{2n+1})_2S_{1.2}$. From a practical standpoint the average composition should be between $$(C_nH_{2n+1})_2S_3 \text{ and } (C_nH_{2n+1})_2S_8$$

preferably $(C_nH_{2n+1})_2S_5$. From the standpoint of converting the oil to amide no particular advantage is obtained in preparing an oil having a sulfur content greater than $S_8$.

Example 1 gives a typical analysis of the general composition of the alkene-sulfur oils employed in the present process. As shown, only small amounts of mercaptans are formed and this appears to be a maximum. In general, the amount of mercaptans formed is less than about 0.5%. Furthermore, only small amounts of mono- and di-sulfides are formed, and the alkene-sulfur oils essentially consist of alkyl trisulfides and higher sulfides. In preparing the oils, at least 5 mols of sulfur are necessary to convert 2 mols of an alkene to an alkene-sulfur oil containing sufficient sulfur to be capable of being converted to amide by reacting with ammonia or an aliphatic primary or secondary amine. In general, at least about 0.6-0.7 mol of sulfur dioxide per mol of alkene is employed in reactions involving sulfur dioxide and hydrogen sulfide.

In the preparation of alkene-sulfur oils by reacting an alkene with sulfur dioxide and hydrogen sulfide, it is to be understood that a catalytic amount of an aliphatic tertiary amine or metal sulfide from the group consisting of cobalt, nickel, zinc and manganese should be added to the reactants. Suitable aliphatic tertiary amines are trimethylamine, triethylamine, tripropylamines and tributylamines. The metal sulfides are usually introduced into the reaction in the form of an aqueous slurry as illustrated in Example 3. Only relatively small amounts of these catalytic materials are used, this being about 1%-5%, based upon the total weight of reaction components. Little or no yield of alkene-sulfur oil is obtained in the absence of these catalytic materials.

In the preparation of the alkene-sulfur oil, the rate of reaction is too low to be practical at temperatures appreciably below 160° C. Prolonged exposure of the alkene-sulfur oils to temperatures above 250° C. results in decomposition. The preferred temperature is between 190° C. and 210° C. In the conversion of oil to amide practical reaction rates are obtained at a temperature of 175° C. and above. Temperatures in excess of 350° C. result in decomposition of the amide product. The preferred temperature is between 240° C. and 270° C.

The conversion of alkene-sulfur oil to amide may be carried out in an aqueous medium or under anhydrous conditions in an inert solvent. Satisfactory solvents include dioxane, pyridine and benzene. When substantially anhydrous conditions prevail, the alkanoic acid amide is a thioamide containing the group —CSNR$_2$ where R is hydrogen or an alkyl radical. When water is present, the corresponding amide contains the group —CONR$_2$ where R is hydrogen or alkyl. Theoretically, 2 mols of ammonia or an aliphatic primary or secondary amine are required to react with 1 mol of the alkene-sulfur oil, the molecular weight of the alkene-sulfur oil being based upon the average composition. Furthermore, when an aqueous medium is used, 2 mols of water are theoretically required to react with 1 mol of the alkene-sulfur oil. An excess of water and ammonia or amine are preferred, however, and usually 3 mols of water per mol of alkene-sulfur oil, and about 5 mols of ammonia per mol of alkene-sulfur oil are employed. Excessive amounts of water tend to hydrolyze the resulting amide. In general, it should be understood that the proportions of reactants may be varied in the second step of the present process, as the reaction will take place in the presence of any appreciable amounts of the reactants, merely the rate of the reaction and the approach of the yield to theoretical being affected as proportions are varied.

Various aliphatic primary and secondary amines which may be used include methylamine, ethylamine, propylamines, and butylamines.

Since elevated temperatures are required in preparing the alkene-sulfur oil and in the conversion of oil to amines, the reactions are carried out in a closed system to avoid loss of reactants from the reaction medium by vaporization. Consequently, in the absence of applied pressure, the pressure of the system will vary with the temperature of the reaction and the volatility of the reactants or the reaction medium.

I claim:

1. A process for preparing alkanoic acid amides which comprises heating an alkene-sulfur oil of the composition $(C_nH_{2n+1})_2S_x$, wherein $x$ has a value of at least 3, with water and a nitrogen-containing compound from the group consisting of ammonia, aliphatic primary amines, and aliphatic secondary amines, as the sole reactants, at a temperature within the range 175° C. and 350° C. whereby an alkanoic acid amide is produced, and thereafter separating the said alkanoic acid amide from the resulting mixture.

2. The process of claim 1 wherein the alkene-sulfur oil is an oil which is produced by reaction between an alkene and sulfur at a temperature within the range of 160° C. and 250° C.

3. The process of claim 1 wherein the said alkene-sulfur oil is an oil obtained by reaction between an alkene and sulfur in the presence of hydrogen sulfide at a temperature within the range of 190° C. and 210° C.

4. The process of claim 1 wherein $x$ has a value of from 3 to 8 inclusive, and $n$ has a value of from 2 to 4, the alkene-sulfur oil being the oil obtained by reaction between an alkene, containing from 2 to 4 carbon atoms, and sulfur in the presence of hydrogen sulfide at a temperature within the range of 190° C. to 210° C.

5. The process of claim 1 wherein the alkene-sulfur oil is the oil which is obtained by heating an alkene and a mixture of sulfur dioxide and hydrogen sulfide in the presence of a catalytic quantity of an aliphatic tertiary amine.

6. The process of claim 1 wherein the alkene-sulfur oil is the oil obtained by reaction between an alkene and a mixture of sulfur dioxide and hydrogen sulfide in the presence of a catalyst from the group consisting of cobalt, nickel, zinc, and manganese sulfides.

7. The process of claim 6 wherein the said alkene-sulfur oil is prepared at a temperature within the range of 160° C. and 250° C.

8. The process of claim 6 wherein the said alkene-sulfur oil is prepared at a temperature within the range of 190° C. and 210° C.

9. A process for preparing propionamide which comprises heating a polysulfide oil of the formula $(C_3H_7)_2S_x$, wherein $x$ has a value of from 3 to 8 inclusive, with ammonia and water at a temperature within the range of 175° C. and 350° C., without additional free or combined sulfur, whereby the said polysulfide oil, water, and ammonia react to produce propionamide, and thereafter separating the said propionamide from the resulting reaction mixture.

10. A process for preparing propionamide which consists essentially in heating a polysulfide oil of the formula $(C_3H_7)_2S_x$, wherein $x$ has a value of from 3 to 8 inclusive, with ammonia and water at a temperature within the range of 240° C. to 270° C., whereby the polysulfide oil, water, and ammonia react to produce propionamide, and thereafter separating the said propionamide from the resulting reaction mixture.

11. The process of claim 10 wherein the said polysulfide oil is the oil which is obtained by reaction between propylene, sulfur dioxide and hydrogen sulfide in the presence of trimethylamine catalyst at a temperature of 190° C. to 210° C.

12. A process for preparing acetamide which comprises heating an ethylene-sulfur oil of the composition $(C_2H_5)_2S_x$, wherein $x$ has a value of at least 3, with ammonia and water at a temperature within the range of 175° C. and 350° C., whereby acetamide is produced, and thereafter separating the said acetamide from the resulting reaction mixture.

13. A process for producing isobutyramide which comprises heating an isobutylene-sulfur oil of the composition $(C_4H_9)_2S_x$, wherein $x$ has a value of at least 3, with ammonia and water at a temperature within the range of 175° C. and 350° C., whereby isobutyramide is produced, and thereafter separating the said isobutyramide from the resulting reaction mixture.

14. The process of claim 13 wherein the said isobutylene-sulfur oil is an oil which is produced by reaction between isobutylene, sulfur dioxide and hydrogen sulfide in the presence of trimethylamine at a temperature within the range of 190° C. to 210° C.

HARRY A. STRAW.

References Cited in the file of this patent

UNITED STATES PATENTS

| Number | Name | Date |
| --- | --- | --- |
| 2,051,806 | Allen | Aug. 25, 1936 |
| 2,459,706 | King | Jan. 18, 1949 |
| 2,495,567 | Carmack | Jan. 24, 1950 |